W. M. Henderson.
Mechanical Movement.
N°. 95,586. Patented Oct. 5, 1869.
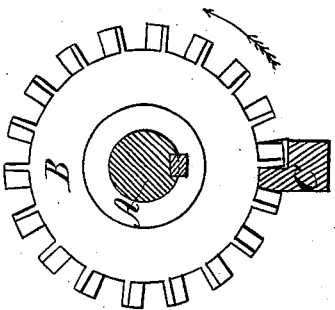
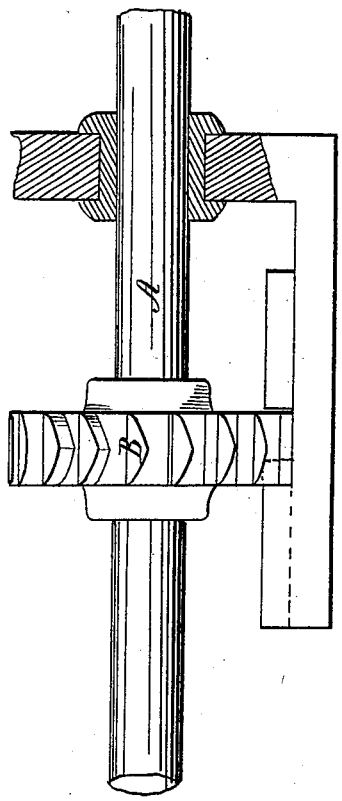
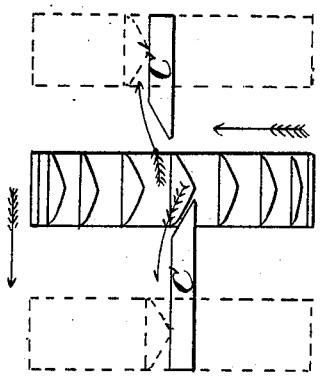
Witnesses
N. J. Brinton
John Russell
Inventor
William M. Henderson

United States Patent Office.

WILLIAM M. HENDERSON, OF PHILADELPHIA, PENNSYLVANIA.

Letters Patent No. 95,586, dated October 5, 1869.

IMPROVED MECHANICAL MOVEMENT.

The Schedule referred to in these Letters Patent and making part of the same.

*To all whom it may concern:*

Be it known that I, WILLIAM M. HENDERSON, of the city of Philadelphia, and State of Pennsylvania, have invented a new and useful Mechanical Movement for converting rectilinear into circular motion, the description, operation, and utility of which will be hereinafter more fully described.

The object of this invention is to produce an intermittent rotary feed-motion to a spindle or shaft, such as a drill-stock for mining-operations, as applied to rock or coal-drilling machines, feed-bars for planing-machines, feed-bars for planing-machines, clock-work escapement, paper-cutting and ruling machines, and others, where an intermittent feed-motion is required, such as is given by the well-known ratchet-and-pawl device, which device, owing to certain inherent peculiarities, cannot always be applied to advantage.

The nature of this invention will be understood by reference to the annexed drawing, and to the letters of reference marked thereon, in which—

Figure 1 is an elevation,

Figure 2, an end view of the same, and

Figure 3, a diagram explanatory of the movement.

Selecting, for example, an application of this device to the turning of a drill-stock for a rock or coal-drilling machine, where a traversing motion is imparted by steam or other motive-power: In such an operation as this, it is necessary that the drill shall change position after each and every stroke or blow, and while the drill is retreating, or at all events before it again comes in contact with the substance to be cut, for if attempted then, it is obvious the drill or some other part of the machinery will be broken. It is also imperative that the drill be driven straight forward to its work, and that there must be no yielding to the right or to the left, in consequence of any irregularity of the surface acted upon.

In such a case, a ratchet and pawl, although they could be arranged to give the necessary motion, and at the right time, still, being free to move in the contrary direction to the lock of the teeth, the drill, in striking an oblique surface, instead of being held to its cut, would yield to the inclination of surface, and consequently the drilling could not be done in an efficient manner, if accomplished at all.

Upon the drill-stock A is secured a toothed wheel, B, one side of the teeth of which is formed with a double-inclined surface, while the other sides of the teeth may be parallel to each other, as shown.

Tangent to the teeth of this switching-wheel is a plate, with double frogs, C C', so arranged, in reference to the teeth of the wheel, that upon motion being given to the drill-stock, say in the direction of the arrow, the frog C will cause a partial turn of the wheel to the right.

When the return stroke is being made, the other frog, C', will encounter the opposite point of the same tooth, and complete the movement of the wheel, still in the same direction.

It will be observed this second movement brings a new tooth in position to be operated upon by the first frog C, which then throws this new tooth forward in position to be acted upon by the second frog C', which, continuing the motion of the wheel, rotation will be carried on *ad infinitum*, as long as the drill-stock is reciprocated.

The same effect will be produced upon the wheel if the frog-plate is reciprocated instead of the drill-stock.

The point where the turning is effected can be arranged to occur at the middle, or any part of the stroke desired. It will, at the same time, be observed that in all other positions, except where the turning does occur, the wheel, and consequently the drill-stock, are firmly held from turning by the teeth of the wheel locking on the straight part of the frogs.

The relative position of these frogs, in reference to the teeth of the wheel, is not an arbitrary matter. They may be placed on opposite sides of the wheel, or may be made to act in conjunction with any particular teeth upon the circumference.

Other modifications of this principle of converting rectilinear into intermittent circular motion may be substituted for the plan herein described, as, for instance, the frogs may be arranged on the inner circumference of a drum, enveloping the toothed wheel, in which case the drum can be made to revolve around the wheel, or the wheel within the drum, by the locking of the one or the other, as may be desired; or, instead of teeth, the wheel may be pierced with angle-holes, while the necessary motion may be obtained by pointed spikes, equivalents which will effect precisely the same results.

I claim, as my invention—

The construction of a spur-wheel, B, with teeth of a triangular form, in combination with two frogs, C C', which, by a rectilinear motion of the frogs, or of the wheel in line with its axis, will impart an intermittent rotary motion to the wheel, or to the frogs, at a point intermediate from the ends of the stroke, where it shall be rigidly held from turning by the combined action of the teeth of the wheel, the inclined faces of the frogs, and their parallel continuations, as set forth.

Philadelphia, August 5, 1869.

WILLIAM M. HENDERSON.

Witnesses:
N. J. BRINTON,
JOHN RUSSELL.